Patented July 4, 1939

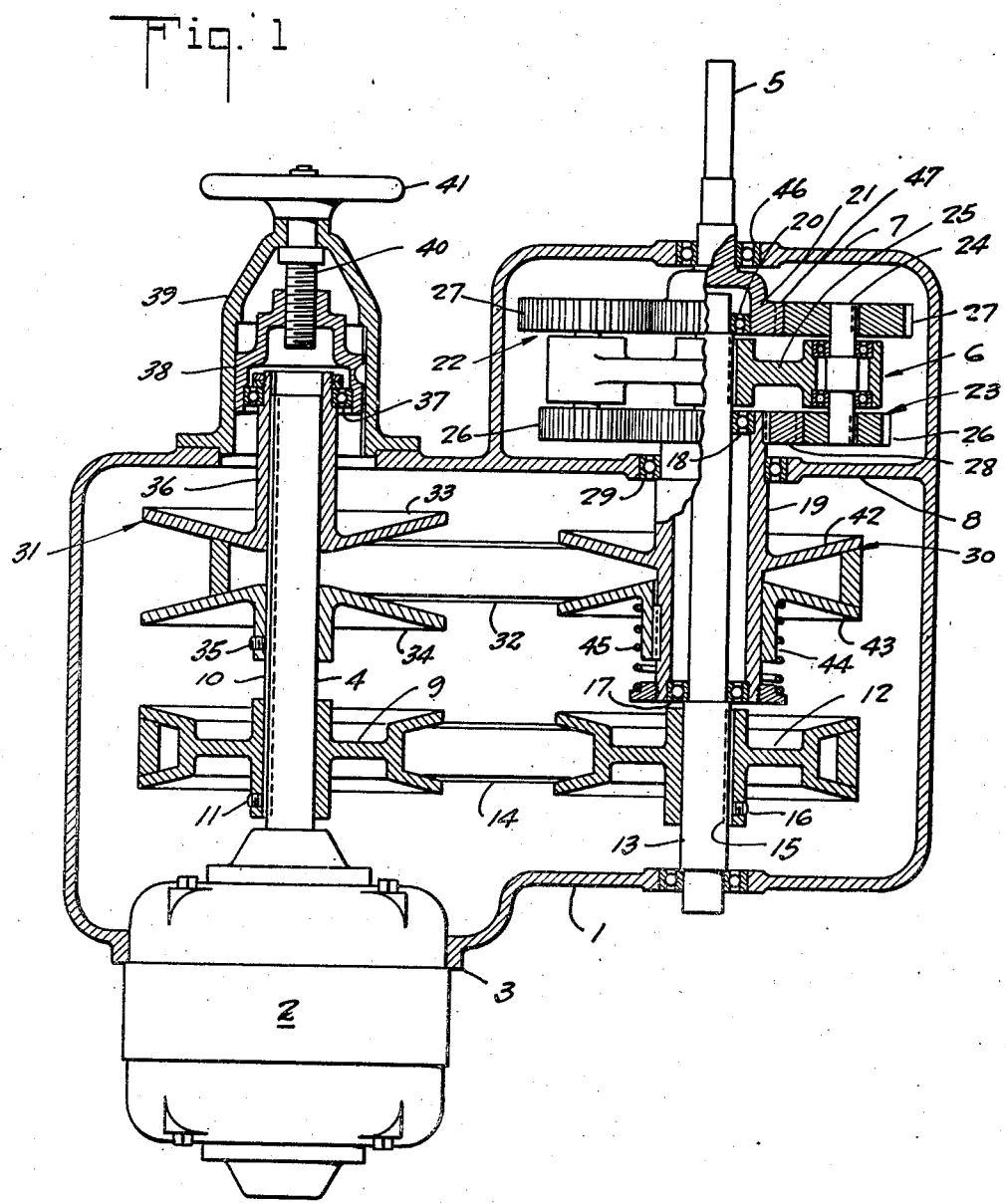

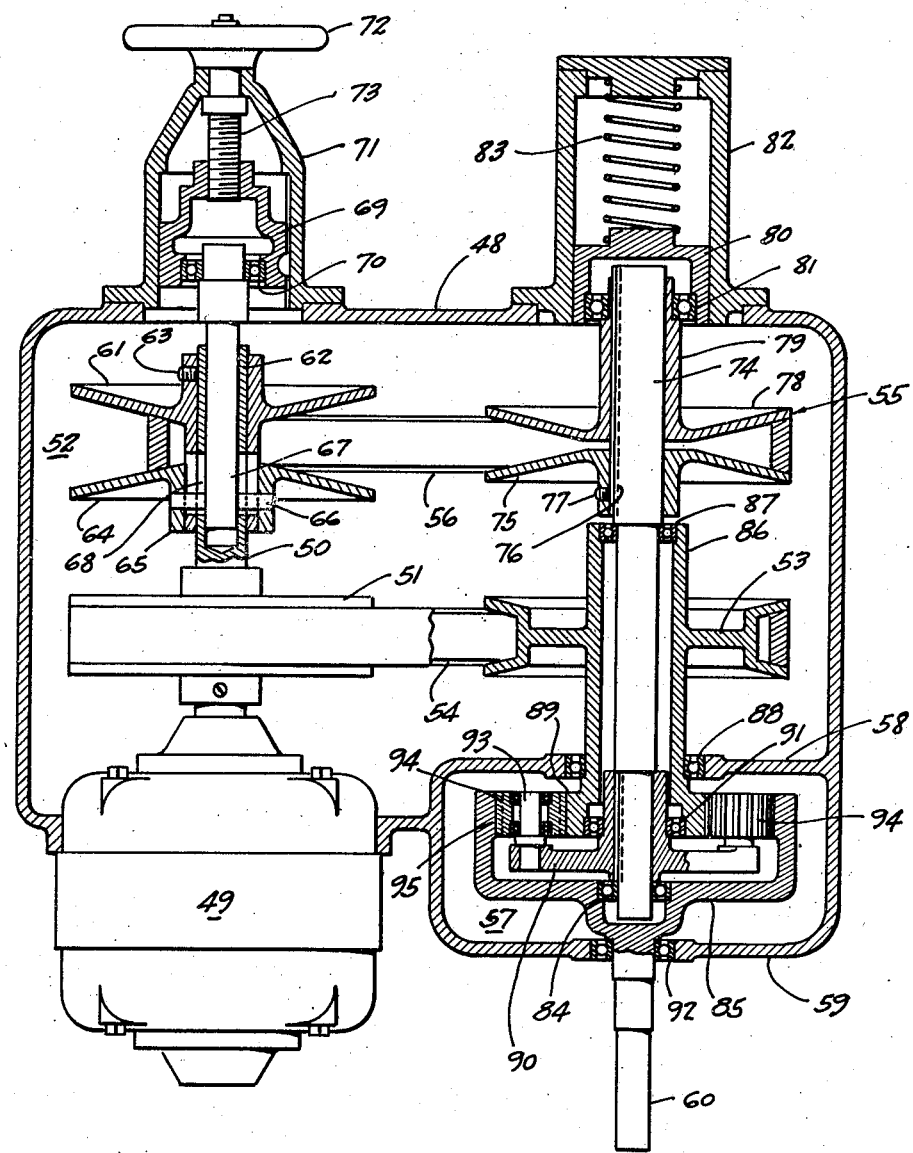

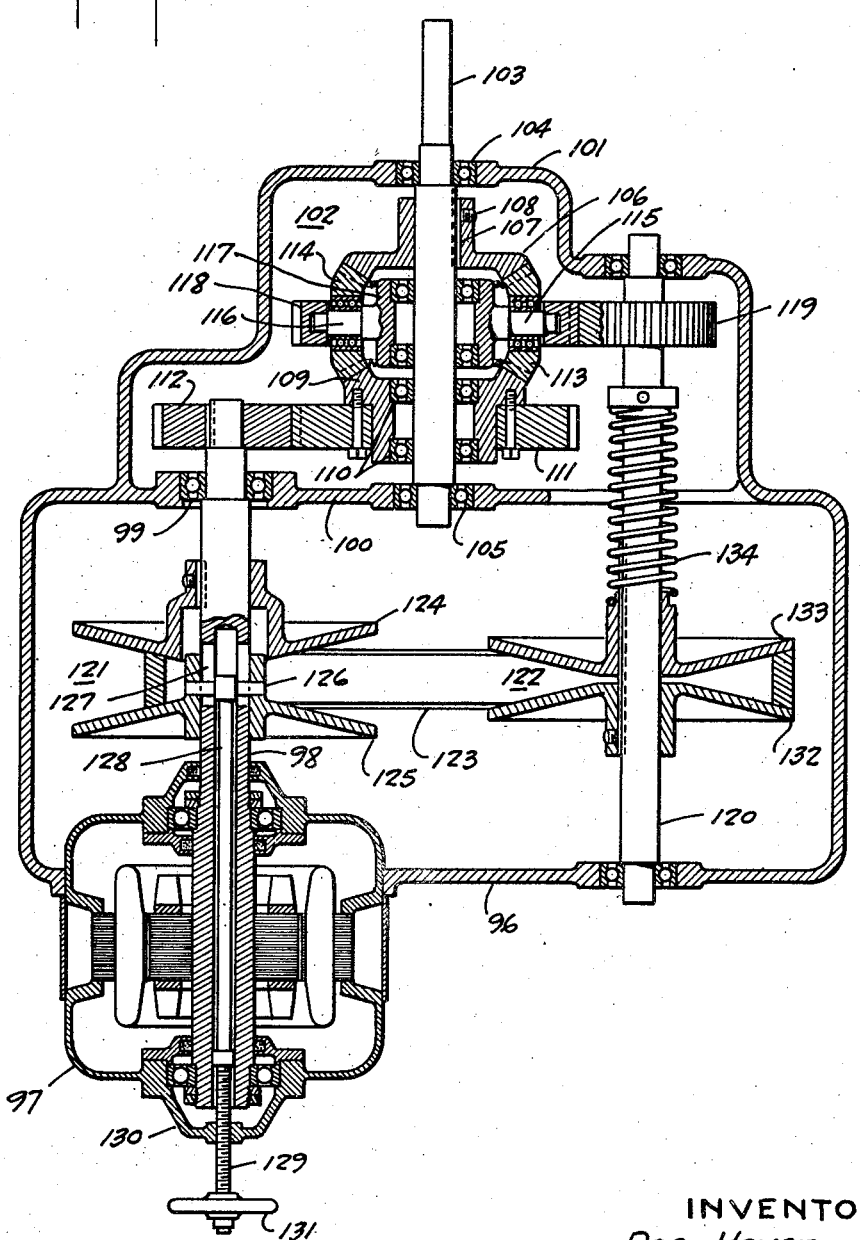

2,164,818

UNITED STATES PATENT OFFICE 2,164,818

VARIABLE SPEED POWER UNIT

Don Heyer and George T. Pfleger, Los Angeles, Calif., assignors to U. S. Electrical Motors, Inc., a corporation of California Application July 11, 1933, Serial No. 679,896
Renewed June 13, 1938

15 Claims. (Cl. 74—286)

This invention relates to a power unit that is capable of driving a load at varying speeds.

The most convenient available source of power is electricity; and electric motors are in common use for driving a large variety of loads. A majority of the electric power systems provide only alternating current energy; and the most practical type of motor for such installations is an induction motor. However, such motors are inherently substantially constant speed sources, the variation in speed over its range of operation being of minor order.

It has been proposed to vary the delivered speed of such motors over a considerable continuous range, as by variable pulley structures having variable effective diameters. A system of this character is described and claimed in my co-pending application, Serial No. 667,387, entitled "Variable speed electric motor drive", and filed April 22, 1933.

In that application, there is described a variable speed drive comprising a driving and a driven pulley connected by a flexible V-belt, the driving pulley being mounted on the shaft of the motor. One of the two pulleys has a variable effective diameter in order to vary the speed of the driven pulley. The variable pulley structure, to effect this result, includes a pair of relatively axially movable sections having opposed inclined or conical faces, adapted respectively to engage opposite sides of the V-belt. When the faces are separated, the belt is allowed to move inwardly toward the axis, and the effective diameter is reduced. Conversely, when the faces are brought closer together, the belt rides radially outwardly from the axis, and the effective diameter is increased.

A drive of this character makes possible a comparatively wide speed variation; but it is never possible to adjust the speed to zero or to reverse the direction of rotation by a mere variation in the relative pulley diameters.

It is one of the objects of the invention to make it possible to vary the speed of a driven shaft through zero, in a continuous manner, and during continual operation of the source of power.

The possibility of providing such a wide speed variation renders the application of such systems practical for all kinds of loads. For example, the speed of a printing press drive must be capable of varying from a high speed down to a very slow speed, corresponding to "make-up" speed and "operating" speed. The present invention makes it possible to secure this wide range of speeds while the motor is fully energized and operatively connected to the load.

It is, accordingly, another object of the invention to provide a variable speed drive of this character in which a variable pulley structure is utilized as an element in the drive.

The wide speed variation is secured by a provision of a mechanism which is capable of subtracting speeds; one speed can be a constant one such as that of the motor, and the other, a variable speed such as that obtained by a variable pulley structure operated by the motor.

This invention possesses many other advantages, and has other objects which may be made more easily apparent from a consideration of several embodiments of the invention. For this purpose there are shown a few forms in the drawings accompanying and forming part of the present specification. These forms shall now be described in detail, which illustrate the general principles of the invention; but it is to be understood that this detailed description is not to be taken in a limiting sense, since the scope of the invention is best defined by the appended claims.

Referring to the drawings:

Figure 1 is a view, mainly in horizontal section, of one embodiment of the invention; and Figs. 2 and 3 are views similar to Fig. 1, but of modified forms of the invention.

In Fig. 1 there is shown a casing 1 within which substantially all of the variable speed mechanism can be housed. A source of power, such as the electric motor 2 is shown as supported by a flange 3 on the wall of the casing 1, so that its shaft 4 extends substantially across the casing 1.

The arrangement is such that a driven shaft 5 extends out of a casing 1 to be coupled in any appropriate way to a load such as a printing press or the like. This load may be of such character as to require a gradual acceleration from standstill. By the aid of the transmission mechanism now to be described, this result can be effected, although the motor 2 may be running at full speed at all times.

Thus a differential mechanism 6 is supported between the walls 7 and 8 of the casing 1. This differential mechanism is arranged to drive shaft 5 at a speed which is a combination of two speeds. One of these two speeds is derived from shaft 4 by a constant ratio motion transmission mechanism, and the other speed is derived from a variable ratio motion transmission mechanism. By varying the ratio of the variable ratio transmission mechanism, the desired wide range of variation in the speed of the load shaft 5 can be obtained.

The constant ratio speed transmission mechanism, shown in this instance as having a ratio of 1 to 1, includes a grooved pulley 9 rigidly fastened to the motor shaft 4, as by the aid of the key 10 and set screw 11. This grooved pulley 9 is in driving relationship with a similar grooved pulley 12, mounted on a shaft 13. The driving relation is secured by the aid of a flexible V-belt 14, accommodated in the grooved faces of the pulley structures 9 and 12.

Pulley structure 12 is rigidly fastened to the shaft 13, as by the aid of the key 15 and set screw 16. This shaft is mounted for rotation at one end in appropriate ball bearings in the wall of the casing 1. It is further supported as by ball bearing structures 17 and 18 inside of a sleeve 19, as well as by the ball bearing structure 20 inside of a driven gear member 21 fastened to the driven shaft 5.

This constant ratio transmission mechanism carries the planetary elements of one type of differential gearing. These planetary elements include a pair of sets of gears 22 and 23. Each set of gears includes a shaft 24 spaced parallel from the axis of shaft 13 and mounted for free rotation in a spider 25. Rigidly connected to the opposite ends of shafts 24 are the spur gears 26 and 27. Spur gear 26 is shown as smaller in size than spur gear 27. Both spur gears 26 mesh with a spur gear 28 which is coaxial with the shaft 13, and which is driven at a variable speed. In order to effect this result, gear 28 is firmly keyed to the sleeve 19. The sleeve 19 is supported not only rotatably on the shaft 13 as by the ball bearing structures 17 and 18, but is also supported by ball bearing structure 29 in the wall 8 of the casing 1.

The sleeve 19 is rotated by a motion transmission mechanism having a variable ratio. This motion transmission mechanism includes a variable diameter pulley structure 30, mounted on sleeve 19, and a similar variable diameter pulley structure 31 mounted upon the shaft 4. These two pulley structures are connected together by a flexible V-belt 32.

The variable pulley structure 31 includes a pair of relatively axially movable pulley sections 33 and 34, having opposed inclined faces. It is apparent that when the sections 33 and 34 are moved together, the belt 32 rides radially outwardly on the sections 33 and 34, thereby increasing the effective pulley diameter. Conversely, a separation of the sections 33 and 34 permits the belt 32 to move radially inwardly, thereby decreasing the pulley diameter.

The effective pulley diameter of structure 31 is, in the present instance, secured by a positive mechanical adjustment of sections 33 and 34. Thus, in the present instance, section 34 is axially fixed on shaft 4 as by the aid of key 10 and the set screw 35. The section 33, however, is axially adjustable as by having an elongated hub 36, which is splined on key 10. This hub 36 is supported as by the aid of the thrust ball bearing structure 37 inside of an axially adjustable cup 38. The inner race of the ball bearing structure 37 is rigidly fastened to the hub 36, and the outer race is fastened to the inside of the cup 38.

Cup 38 is guided for axial motion inside of a tubular extension 39 for the casing 1, and is restrained against angular motion therein. It is axially moved as by the aid of a threaded stud 40, journalled in a journal bearing in member 39, and adapted to be mechanically rotated as by the hand wheel 41. The threaded stud 40 engages an axial threaded aperture in cup 38. It is apparent that rotation of wheel 41 in one or the other direction will cause a corresponding axial adjustment of cup 38, resulting in a corresponding axial movement of the section 33.

Variations in the effective pulley diameter of structure 31 automatically cause a corresponding but opposite variation in the corresponding pulley structure 30. This pulley structure has an axially fixed section 42 and an axially adjustable section 43. For this purpose section 42 is indicated in the present instance as formed integral with the sleeve 19; and section 43 is shown as having a hub 44 splined to the sleeve 19. A compression spring 45 urges the section 43 toward section 42 at all times.

When the hand wheel 41 is rotated to increase the effective diameter of pulley structure 31, it is apparent that the belt 32 will act as a wedge between the sections 42 and 43, and will spread them apart against the resilient force exerted by the spring 45. The net result is that as the effective diameter of structure 31 increases the effective diameter of structure 30 automatically decreases. The ratio of transmission thus secured is thereby increased, the speed of rotation of sleeve 19 being greater than before this adjustment. Similarly, movement of wheel 41 to reduce the effective diameter of structure 31 will cause the belt 32 to be slackened between the sections 42 and 43, and this slack is taken up by expansion of spring 45. In this way a reduction of the pulley diameter of structure 31 results automatically in an increase in the effective pulley diameter of structure 30, and the ratio of transmission is reduced.

In the present instance, the ratio can vary approximately from about 1 to 1 to about 1 to 2 or 3.

It is thus apparent, as so far described, that the planetary gear sets 22 and 23 are rotated at a fixed speed, depending solely upon the speed of motor 2; and that the speed of the gear 28 is variable between rather wide limits. Since motor 2 is usually an alternating current induction motor type, the planetaries 22 and 23 are revolved in their planetary course at a substantially constant speed.

The load shaft 5 is rigidly connected to the member 21, and is journalled as by the aid of the ball bearings 46 in the wall 7 of casing 1, as well as by the ball bearings 20 inserted between the member 21 and shaft 13. The member 21 carries a spur gear 47 which meshes with the planetary gears 27. Since planetary gears 27 are larger in diameter than planetary gears 26, it is apparent that gear 27 must be correspondingly smaller than the gear 28. It can be demonstrated that if there is a sufficient difference between the ratio of gear 28 to gear 26, and the ratio of gear 47 to gear 27 it is possible, by sufficiently reducing the diameter of variable pulley structure 31, to reduce the speed of gear 47 to zero. Thus, during continual rotation of shaft 13, it is possible to bring the ultimate load speed to zero by reducing the diameter of pulley structure 31.

It is furthermore apparent that gear 47 is driven at a speed which is a combination of the speed of rotation of gear 28 and the speed of rotation of spider 25; and that the gear 47 is in driving relation with the other elements of the structure through the intermediary of the planetary gears 26 and 27.

When the diameter of variable pulley structure 31 is adjusted to be the same as that of the invariable pulley 9, the arrangement is such that the speed of the driven shaft 5 is the same as the speed of shaft 13. It is noted that these speed variations are effective without the necessity of crossed belts, pulleys 12 and 30 being continually rotated in a common direction. Furthermore, should there be a sufficient reduction possible in the effective diameter of pulley structure 31, it is possible actually to reverse the direction of shaft 5.

In the form of the invention shown in Fig. 2, a slightly different type of differential mechanism is illustrated. In this form the casing 48 supports, as before, an electric motor 49 having a shaft 50. This shaft 50 carries a grooved pulley 51 of fixed diameter as well as a variable pulley structure 52. The pulley structure 51 forms with the corresponding pulley structure 53 a fixed ratio transmission mechanism. These two pulleys 51, 53 are joined by the flexible V-belt 54.

The variable ratio transmission mechanism includes the pulley structure 52 as well as an adjustable pulley structure 55. Pulley structure 52 and 55 are joined as by a flexible belt 56.

A differential mechanism, driven by the two transmission mechanisms is accommodated in a chamber 57 formed by the walls 58 and 59 of casing 48. The driven or load shaft 60 extends beyond the wall 59 for coupling it to any desired load.

The mode of adjustment of the pulley structure 52 will now be described. Section 61 of this pulley structure is fixed to the hollow extension 62 of shaft 50, as by a set screw 63. The axially adjustable section 64 has a hub 65 through which passes a diametric pin 66. This pin 66 is fastened to a shaft 67 telescoping in the hollow portion 62. The hollow portion 62 has slots 68 permitting axial adjustment of shaft 67. It is, furthermore, apparent that pin 66 in conjunction with slots 68 form a driving connection between shaft 50 and section 64.

Shaft 67 is axially adjustable to move section 64 toward and from section 61. For this purpose this shaft is rotatably mounted in a cup 69 by the aid of the ball thrust bearings 70. Cup 69 is axially slidable in the hollow extension 71 of casing 48, but the hub is restrained against angular motion. Hand wheel 72 fastened to the threaded stud 73 is utilized for moving the cup 29 axially in a manner entirely similar to the mechanism shown in Fig. 1.

The corresponding adjustable pulley structure 55 is mounted on a shaft 74. Section 75 of structure 55 is axially fixed on shaft 74 as by the aid of a key 76 and set screw 77. The corresponding section 78 has an elongated hub 79 which is axially slidable on shaft 74 as by the aid of splines. In order to slide the section 78 axially, hub 79 is journalled in a cup 80 as by the aid of the ball thrust bearings 81. The cup 80 is slidable inside of cylindrical casing 82, and is restrained against angular rotation therein. A compression spring 83 resiliently urges the cup 80 downwardly so as to tend to bring the sections 75 and 78 together.

Shaft 74 is further rotatably supported as by the aid of the ball bearing structure 84 inside of the member 85. This member 85 is shown as connected rigidly to the driven shaft 60.

The constant ratio transmission mechanism serves to rotate a sleeve 86 surrounding the shaft 74. This sleeve is journalled by the aid of the ball bearings 87 on the shaft 74. It is, furthermore, journalled as by the ball bearings 88 in wall 58.

Sleeve 86 is shown as integrally joined to a spur gear 89 having an axis coaxial with the sleeve 86 and located in chamber 57. Similarly, shaft 74 rotates a spider 90 which is keyed to the shaft 74 and is journalled in the appropriate contiguous parts between ball bearings 91, 92. The spider 90 carries a plurality of shafts 93 spaced from the axis of the shaft 74. Upon these shafts 93 are mounted for free rotation the planetary gears 94. These planetary gears are thus revolved in their planetary course by shaft 74. They are, furthermore, in mesh with the gear 89, and are also in mesh with the internal gear 95 shown as integral with the member 85. It is thus seen that the internal gear 95 is the driven gear since it is rigidly and permanently fastened to the driven shaft 60.

It is also seen that the planetary gears 93 are driven at a variable speed, and that the spur gear 89 is driven at a constant speed. Both of these speeds are in the same direction. However, the resultant speed of rotation of driven gear 95 is a combination of these two speeds. It can be shown that if the ratio of transmission between pulley structures 52 and 55 be small enough, the resultant speed of gear 95 can be brought to zero, and in fact can be reversed. The required reduction in the ratio of transmission by the variable pulley structure depends to some extent upon the diameters of the planetary gears 94.

As in the first form described, it is apparent that the driven gear 95 is in driving relation with the constant ratio mechanism and the variable ratio mechanism.

The mode of adjusting the variable speed transmission mechanism is substantially the same as in the first form described. The diameter of pulley structure 55 is automatically adjusted in response to the variation in the effective pulley diameter of pulley structure 52.

In the forms so far described the gear elements making up the differential mechanism are spur gears. In the form shown in Fig. 3, a bevel gear differential mechanism is disclosed. In this form there is a casing 96, on one wall of which is supported the electric motor 97. The shaft 98 of the electric motor 97 is journalled as by the aid of a ball bearing structure 99 in the wall 100 of the casing 96.

The wall 101 of the casing forms a space 102 for the accommodation of a differential gear mechanism serving to drive the load or driven shaft 103 extending out of the casing. This driven shaft is journalled as by ball bearings 104 and 105 in walls 101 and 100. The differential mechanism comprises a beveled gear 106 fastened to the driven shaft 103 as by the key 107, and set screw 108. Opposed to this beveled gear 106 is a beveled gear 109 driven from the motor shaft through a constant ratio transmission mechanism. Thus, for example, bevel gear 109 can be rotatably mounted upon shaft 103 as by the ball bearing structures 110. Fastened over the hub of bevel gear 109 is a spur gear 111 driven at a constant speed as by the aid of the gear 112 fastened to the shaft 98. It is apparent that bevel gear 109 is thus driven through a constant ratio motion transmitting mechanism.

Meshing with both of the bevel gears 106 and 109 are a pair of planetary gears 113 and 114. These planetary bevel gears are mounted for rotation on the radial spokes 115, 116 of a spider 117. The spider 117 is mounted as by the aid of ball bearings for free rotation upon shaft 103. Rotation of spider 117 is obtained by the aid of a variable transmission mechanism. This includes the spur gear 118 extending concentrically around the spider 117 and appropriately fastened thereto for driving relation therewith. Gear 118 can be made in split halves, so as to facilitate assembly with respect to the spider 117. This gear 118 is, furthermore, driven by a gear 119 mounted on a shaft 120 which is driven through a variable ratio transmission mechanism. This shaft 120 is appropriately journalled in the walls of casing 96.

The variable ratio mechanism comprises the variable pulley structure 121 mounted on the motor shaft 98, and a corresponding variable pulley structure 122 mounted on shaft 120. These two pulley structures are connected as by a flexible belt 123.

The pulley section 124 of structure 121 is fixed against axial movement. The corresponding section 125, however, is axially movable with respect to section 124. A pin 126 passes through the hub of section 125, and also passes through slots 127 in the hollow portion of shaft 98. The pin 126 passes through a thrust rod 128 accommodated inside of the hollow portion of shaft 98. It is apparent that by pushing rod 128 upwardly the effective pulley diameter is increased. The thrust rod 128 is adapted to be moved axially as by the aid of a screw 129 threaded into an aperture in the bracket 130. The inner end of screw 129 abuts against the lower end of thrust rod 128. This screw 129 can be manually rotated as by the hand wheel 131. When the effective diameter of structure 121 is increased by turning screw 129 into the hollow portion of shaft 98, the corresponding pulley structure 122 has its effective diameter automatically reduced. In order to accomplish this result, pulley structure 122 includes a section 132 fixed upon shaft 120. The corresponding section 133 is axially movable as by being splined to shaft 120. A compression spring 134 exerts a resilient force always tending to bring the sections 132 and 133 together.

As the effective diameter of pulley 121 is positively increased by the aid of the thrust rod 128 the belt 123 wedges the sections 132 and 133 apart, and the effective diameter of pulley structure 122 is decreased. However, upon retraction of the screw 129, compression spring 134 is permitted to expand to take up the resultant belt slack, and section 125 is urged downwardly, causing a reduction in the effective diameter of pulley structure 121.

It can be shown that, when gears 111 and 118 are rotated at the same speed, the driven or load shaft 103 rotates at the same speed. However, this condition exists when the effective diameter of pulley structure 121 is a maximum. Now as the effective diameter of this pulley structure is reduced, the speed of gear 118 is correspondingly reduced, and upon a sufficient reduction the shaft 103 can be caused to stand still. Further reduction beyond this point would cause a reversal in the direction of rotation of shaft 103.

In this case also it is apparent that the driven gear 106 is in driving relation with respect to both transmission mechanisms through the intermediary of bevel gears 113, 114. It is, furthermore, apparent that the speed of shaft 103 is a combination of the speeds of motor shaft 98 and of shaft 120. By the aid of the differential mechanism it is thus apparent that the load shaft has a wider speed variation than could possibly be obtained by a mere variation in effective pulley diameters. As pointed out heretofore, this is highly desirable for driving certain kinds of loads such as printing presses, which require a gradual bringing of the load up to a maximum speed from zero. The mechanisms described are well adapted to perform this function.

We claim:

1. In an enclosed electrically driven variable speed power unit, a planetary gear mechanism having two actuating members and a driven member, means forming a constant ratio power transmission actively engaging one of said actuating members of the planetary gear mechanism, means forming a variable ratio power transmission actively engaging the other of said actuating members of the planetary gear mechanism, a casing having walls enclosing, and means supporting, said planetary gear mechanism and the associated power transmissions; a load driving means engaged by said driven member of the planetary gear mechanism and projecting outside of said casing, a driving shaft for operating said power transmissions, an electric motor in axial driving relation to said driving shaft, and means supporting said electric motor by one wall of said casing.

2. The construction as set forth in claim 1; in which said constant ratio power transmission includes a driving means and a driven means, one of said means being secured to said driving shaft; and in which said variable ratio power transmission includes a pair of adjustable pulley structures, each of said pulley structures including a pair of pulley sections having opposed inclined belt engaging faces forming by relative axial adjustment variable effective pulley diameters a belt in active driving relation to said pulley structures and ratio adjusting means for adjusting the relative axial position of at least the pulley sections forming one of said pulley structures.

3. The construction as set forth in claim 1; in which said constant ratio power transmission includes two constant diameter pulleys and a flexible transmission means engaging said pulleys, one of said pulleys being secured to said driving shaft and the other of said pulleys engaging said planetary gear mechanism; and in which said variable ratio power transmission includes a pair of adjustable pulley structures each of said pulley structures including a pair of pulley sections having opposed inclined belt engiging faces forming by relative axial adjustment variable effective pulley diameters, a belt in active driving relation to said pulley structures, one of said pulley structures being secured to said driving shaft and the other of said pulley structures engaging said planetary gear mechanism, and ratio adjusting means for adjusting the relative axial position of at least the pulley sections forming one of said pulley structures.

4. The construction as set forth in claim 1; in which said means supporting said motor includes an aperture formed in the wall of said casing adjacent said motor whereby said motor projects into said casing beyond the wall of said casing adjacent said aperture.

5. In an enclosed electrically driven variable speed power unit, a planetary gear mechanism having two actuating members and a driven member, said actuating members and said driven members being relatively rotatable about a common axis, a shaft rotatably supported coaxial with said planetary gear mechanism and engaging one of said actuating members of said planetary gear mechanism, a tubular shaft rotatably mounted coaxial with said first mentioned shaft, said tubular shaft engaging the other of said actuating members of said planetary gear mechanism, an adjustable pulley structure including a pair of pulley sections having opposed inclined belt engaging faces forming by relative axial adjustment variable effective pulley diameters, said adjustable pulley structure being in axial driving relation to one of said shafts, a constant diameter pulley in axial driving relation to the other of said shafts, a driving shaft, a constant diameter pulley secured to said driving shaft and in power transmission relation to said first mentioned constant diameter pulley, a second adjustable diameter pulley secured to said driving shaft and in power transmission relation to said first mentioned adjustable diameter pulley, means for adjusting the relative axial position of at least the pulley sections forming one of said adjustable diameter pulleys, a casing having walls enclosing, and means supporting, said planetary gear mechanism and said pulley transmissions, a load driving means engaged by said driven member of the planetary gear mechanism and projecting outside of said casing, an electric motor in axial driving relation to said driving shaft, and means supporting said electric motor by one wall of said casing.

6. The construction as set forth in claim 5, in which said casing includes an auxiliary gear case housing said planetary gear mechanism.

7. The construction as set forth in claim 5, in which said means supporting said motor includes an aperture formed in the wall of said casing adjacent said motor, whereby said motor projects into said casing beyond the wall of said casing adjacent said aperture.

8. In an enclosed electrically driven variable speed power unit; a planetary gear mechanism including an internal gear member, a load shaft coaxial therewith and connected thereto, a gear member having external teeth and of smaller diameter than the load gear member, and a planetary gear member interposed between the said other gear members; a pair of shafts coaxial with said load shaft, one of said pair of shafts being tubular and rotatably supported on the other of said pair of shafts, one of said pair of shafts engaging said external gear and the other of said pair of shafts engaging said planetary gear member; a driving shaft, a constant ratio power transmission having one pulley secured to said driving shaft and a second pulley secured to one of said pair of shafts, a variable ratio power transmission having one adjustable pulley structure secured to said driving shaft and a second adjustable pulley structure secured to the other of said pair of shafts; a casing having walls enclosing, and means supporting, said planetary gear mechanism and said power transmissions, an electric motor in axial driving relation to said driving shaft, and means supporting said electric motor by one wall of said casing.

9. The combination of claim 8, in which said variable ratio transmission drives the planetary gear member.

10. The combination of claim 8, in which each of the adjustable diameter pulleys of the variable ratio transmission includes an axially fixed pulley section and an axially adjustable pulley section, said pulley sections having opposed inclined belt engaging faces forming by relative axial adjustment variable effective pulley diameters, the fixed pulley section of one pulley structure being oppositely faced to the similar pulley section of the other pulley structure, and in which the variation in ratio is obtained by the relative axial adjustment of at least the pulley sections forming one of said pulley structures.

11. The combination of claim 8, in which said casing includes an auxiliary gear case housing said planetary gear mechanism.

12. In an enclosed electrically driven variable speed power unit, a driving shaft, a load driving means, means for transmitting power at a varible speed ratio from said driving shaft to said load driving means, said power transmitting means including a driving pulley structure a driven pulley structure and a belt in active driving relation to said pulley structure, at least one of said pulley structures having an adjustable effective diameter, a casing having walls enclosing, and means supporting, said power transmitting means, an electric motor in axial driving relation to said driving shaft, and means for supporting said electric motor by one wall of said casing, said means for supporting said motor including an aperture formed in the wall of said casing adjacent said motor, whereby said motor projects into said casing beyond the wall of said casing adjacent said motor.

13. In an enclosed electrically driven variable speed power unit, a driving shaft, a load driving means, means for transmitting power at a variable speed from said driving shaft to said load driving means, said power transmitting means including a driving pulley structure, a driven pulley structure, and a bet in active driving relation to said pulley structures, at least one of said pulley structures having an adjustable effective diameter, a casing having walls enclosing and means supporting, said power transmitting means, an electric motor in driving relation to said driving shaft, and means for supporting said electric motor by one wall of said casing.

14. In a variable speed drive, a planetary gear mechanism having two actuating members and a driven member, said actuating members and said driven member being relatively rotatable about a common axis, a shaft rotatably supported coaxial with said planetary gear mechanism and engaging one of said actuating members of said planetary gear mechanism, a tubular shaft rotatably mounted coaxial with said first mentioned shaft, said tubular shaft engaging the other of said actuating members of said planetary gear mechanism, an adjustable pulley structure having a pair of pulley sections with opposed inclined belt engaging faces forming by relative axial adjustment variable effective pulley diameters, said adjustable pulley structure being in axial driving relation to one of said shafts, a constant diameter pulley in axial driving relation to the other of said shafts, a driving shaft, a constant diameter pulley secured to said driving shaft and in power transmission relation to said first mentioned constant diameter pulley, a second adjustable diameter pulley secured to said driving shaft and in power transmission relation to said first mentioned adjustable diameter pulley, means for adjusting the relative axial position of at least the pulley sections forming one of said adjustable diameter pulleys, and a load driving means engaged by said driven member of the planetary gear mechanism.

15. In an electrically driven enclosed variable speed power unit, a driving shaft, a load driving shaft, means for transmitting power at an adjustable speed ratio from said driving shaft to said load driving shaft, said power transmitting means including a pair of pulley structures, a belt in active driving relation to said pulley structures, one of said pulley structures being supported on said driving shaft and having an adjustable effective diameter, a casing having walls enclosing, and means supporting, said power transmitting means, an electric motor in axial driving relation to said driving shaft, means for supporting said electric motor by one wall of said casing, and means supported on the wall of said casing opposite said motor and adjacent said driving shaft for adjusting the effective diameter of said adjustable pulley structure.

DON HEYER.
GEORGE T. PFLEGER.